Dec. 7, 1937.　　J. TSCHANTRE　　2,101,482
ANIMAL TRAP
Filed Feb. 23, 1937
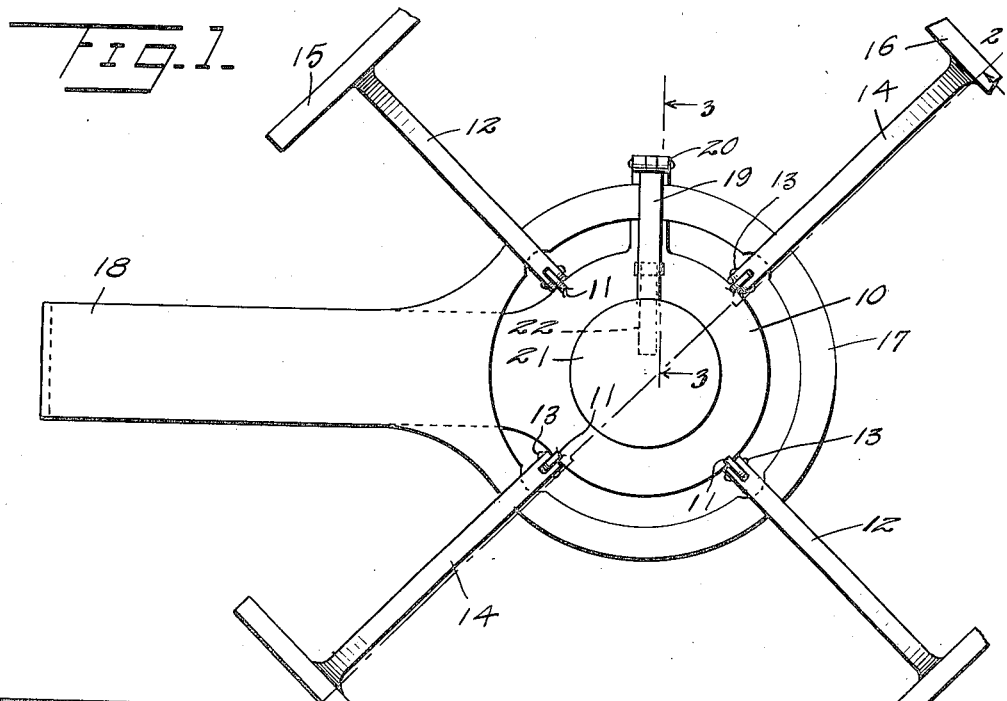
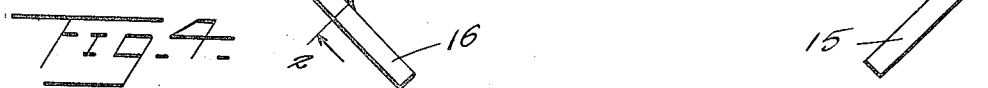
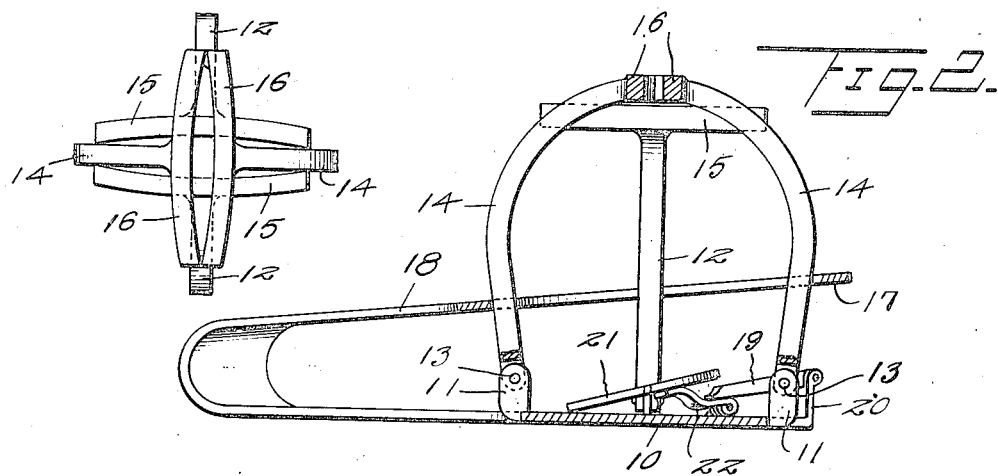
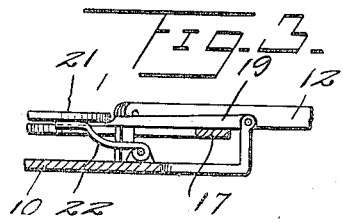
Inventor
Julius Tschantre
By Watson E. Coleman
Attorney Patented Dec. 7, 1937

2,101,482

UNITED STATES PATENT OFFICE 2,101,482

ANIMAL TRAP

Julius Tschantre, New City, N. Y.

Application February 23, 1937, Serial No. 127,238

4 Claims. (Cl. 43—90)

This invention relates to animal traps and more particularly to a trap which is adapted to grip a leg of an animal and to hold the leg against movement relative to the trap without injury to the leg of the animal.

Another object of this invention is to provide a trap of this kind which engages the leg of an animal at two spaced points along the leg in such a manner as to prevent the animal from cutting off that portion of the leg gripped by the trap.

A further object of this invention is to provide in a trap of this kind, a plurality of clamping or gripping members which are gravitatingly held in set position and which, upon tripping of the trigger, are adapted to be swung upwardly about the leg of the animal.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a top plan partly broken away of a trap constructed according to an embodiment of this invention showing the trap in set position.

Figure 2 is a sectional view taken on the line 2—2 of Figure 1, but showing the trap in clamping position.

Figure 3 is a sectional view taken on the line 3—3 of Figure 1.

Figure 4 is a fragmentary top plan of the clamping jaws in clamping position.

Referring to the drawing, the numeral 10 designates generally a base plate which is provided with a plurality of upstanding radially disposed lugs 11, on which a pair of lower clamping arms 12 are pivotally secured by means of pivotal members 13. A pair of upper clamping arms 14 are pivotally secured to another series of lugs 11 carried by the base 10, and are relatively longer than the arms 12. The arms 12 and 14 are longitudinally curved, as shown in Figure 2, so that the upper ends thereof will confront each other with the remaining portions of the arms spaced apart to permit the leg of an animal to be disposed therebetween.

The lower arms 12 are provided at the outer ends thereof with clamping or gripping members 15 which are longitudinally curved with the concave side thereof uppermost when the arms are in set position so that the concave portions will confront each other, as shown in Figure 4, when the trap is sprung and thus hold the leg of the animal against lateral movement.

The arms 14 are provided on the outer ends thereof with clamping or gripping members 16, which are shaped similarly to the gripping members 15 and are adapted to be disposed at a point spaced upwardly from the gripping members 15 when the trap is sprung, as shown in Figure 2, in order that these gripping members 16 will grip the leg of an animal upwardly from the gripping members 15.

An annulus 17 is disposed beneath the arms 12 and 14 when the trap is in set position, and is adapted to draw the arms together upon upward movement thereof, so as to firmly hold the arms in their clamping position. A substantially U-shaped spring 18 has the end of one leg thereof secured to the base 10 and the other leg of this U-shaped spring 18 has the free end thereof secured to the annulus 17. This spring 18 is adapted to constantly urge the annulus 17 upwardly and the annulus 17 is held in set position by means of a trigger 19 which is pivotally secured to an L-shaped support or bracket 20 carried by the base 10. The trigger 19 is adapted to overlie the top of the annulus 17 when the trap is in set position and is held in set position by means of a platform or tripping member 21, which is mounted on an arm 22, pivotally carried by the base 10. The inner or free end of the trigger 19 is adapted to engage beneath an edge of the tripping member 21, with the annulus 17 between the trigger 19 and the base 10 so that the arms 12 and 14 may gravitatingly be swung to a substantially horizontal position above the annulus 17.

In the use and operation of this trap, the annulus 17 is adapted to be forced downwardly toward the base 10 placing the spring 18 under extreme tension and the trigger 19 is then swung over the top of the annulus 17 and the free end of the trigger 19 is positioned beneath an edge of the tripping member 21. The tension of the spring 18 forcing the annulus 17 upwardly will hold the trigger 19 in set position beneath the tripping member 21. When the tripping member 21 is forced downwardly, the trigger 19 is released so that the spring 18 may swing the annulus 17 upwardly, thus drawing the outer or free ends of the arms 12 and 14 together at a point spaced upwardly from the base 10. The gripping members 15 and 16 will tightly grip about the leg of the animal that has sprung the trap in such a manner as not to seriously injure the leg of the animal and not to stop the circulation of blood in the leg of the animal.

This trap may be used with or without bait, the trap being particularly designed for use in the run or path of the animal so that the trap may be partially buried beneath loose dirt or other material.

When the trap is partially buried in dirt or loose material, the jaws will not be clogged or prevented from closing as is the case with traps having U-shaped jaws.

It is, of course, understood that various changes and modifications may be made in the details of construction and design of the above specifically described embodiment of this invention without departing from the spirit thereof, such changes and modifications being restricted only by the scope of the following claims.

I claim:—

1. A trap comprising a base member, a plurality of opposed arms pivoted to said base member, jaws carried by the free ends of said arms and extending at right angles to the length thereof, said jaws being longitudinally curved with the concave sides thereof in confronting relation when said jaws are in clamping position, an annulus engaging beneath said arms when in opened or set position, a substantially U-shaped spring having one leg thereof secured to said base and the other leg thereof secured to said annulus, and releasable holding means carried by said base for holding said annulus in set position.

2. A leg holding trap comprising a base, a pair of opposed relatively short arms, a second pair of opposed relatively long arms, means pivotally securing an end of each arm to said base, an annulus engaging beneath said arms when in opened or set position and adapted upon upward movement thereof to draw said arms upwardly and toward each other, jaw members carried by the free ends of said arms, trip means carried by said base and engageable over said annulus to hold said annulus in set position, and a spring carried by the base and engaging said annulus and constantly urging said annulus upwardly to thereby swing said jaw members upwardly and inwardly to tightly clamp about the leg of an animal, one pair of said jaw members engaging about the leg of the animal below the other pair of jaw members.

3. A leg holding trap comprising a base, a pair of opposed relatively short arms, a second pair of opposed relatively long arms, means pivotally securing an end of each arm to said base, an annulus engaging beneath said arms when in open or set position and adapted upon upward movement thereof to draw said arms upwardly and toward each other, jaw members carried by the free ends of said arms and extending laterally thereof, trip means carried by said base and engageable over said annulus to hold said annulus in set position, and a spring carried by the base and engaging said annulus and constantly urging said annulus upwardly to thereby swing said jaw members upwardly and inwardly to tightly clamp about the leg of an animal, one pair of said jaw members engaging about the leg of the animal below the other pair of jaw members.

4. A leg holding trap comprising a base, a pair of opposed relatively short arms, a second pair of opposed relatively long arms, means pivotally securing an end of each arm to said base, an annulus engaging beneath said arms when in opened or set position and adapted upon upward movement thereof to draw said arms upwardly toward each other, jaw members carried by the free ends of said arms and extending laterally thereof, said jaw members being longitudinally curved with the concave sides thereof in confronting relation when said jaws are in clamping position, trip means carried by said base and engageable over said annulus to hold said annulus in set position, and a spring carried by the base and engaging said annulus and constantly urging said annulus upwardly to thereby swing said jaw members upwardly and inwardly to tightly clamp about the leg of an animal, one pair of said jaw members engaging about the leg of the animal below the other pair of jaw members.

JULIUS TSCHANTRE.